(12) United States Patent
Remillard

(10) Patent No.: US 9,775,295 B2
(45) Date of Patent: Oct. 3, 2017

(54) DRIVE SYSTEM FOR THE REEL OF A CROP HARVESTING HEADER

(71) Applicant: Macdon Industries Ltd., Winnipeg (CA)

(72) Inventor: Rheal Remillard, St. Joseph (CA)

(73) Assignee: MacDon Industries Ltd., Wpg, MB (CA)

( * ) Notice: Subject to any disclaimer, the term of this patent is extended or adjusted under 35 U.S.C. 154(b) by 193 days.

(21) Appl. No.: 14/692,345

(22) Filed: Apr. 21, 2015

(65) Prior Publication Data
US 2016/0309651 A1    Oct. 27, 2016

(51) Int. Cl.
*A01D 34/00* (2006.01)
*A01D 57/02* (2006.01)

(52) U.S. Cl.
CPC .................... *A01D 57/02* (2013.01)

(58) Field of Classification Search
CPC ........ A01D 57/02; A01D 57/03; A01D 45/00; A01D 57/04; A01D 57/12; A01D 61/002; A01D 43/06; A01D 57/00; A01D 57/01; A01F 29/10
USPC .......................................................... 56/220
See application file for complete search history.

(56) References Cited

U.S. PATENT DOCUMENTS

| | | | | |
|---|---|---|---|---|
| 2,008,470 A * | 7/1935 | Rall | ........................ | A01D 57/06 56/219 |
| 2,454,063 A * | 11/1948 | Irvine | .................... | A01D 57/06 56/219 |
| 2,823,511 A * | 2/1958 | Beaty | ..................... | A01D 57/04 56/219 |
| 3,217,473 A * | 11/1965 | Lawrie | .................... | A01D 57/20 56/14.4 |
| 3,638,408 A * | 2/1972 | Swanson | ................ | A01D 57/03 56/219 |
| 4,038,810 A * | 8/1977 | Williams | ............... | A01D 75/02 56/220 |
| 4,353,201 A * | 10/1982 | Pierce | .................... | A01D 57/08 56/130 |
| 5,359,839 A * | 11/1994 | Parsons | .................. | A01D 57/03 460/122 |
| 6,381,932 B1 * | 5/2002 | Clauss | ................... | A01D 57/04 460/2 |
| 6,453,655 B2 * | 9/2002 | Ferraris | .................. | A01D 57/03 56/126 |
| 6,530,202 B1 * | 3/2003 | Guyer | .................... | A01D 57/03 56/220 |
| 6,591,598 B2 | 7/2003 | Remillard | | |

(Continued)

*Primary Examiner* — Arpad Fabian-Kovacs
(74) *Attorney, Agent, or Firm* — Adrian D. Battison; Ade & Company Inc.

(57) ABSTRACT

A crop harvesting header includes a cutter bar arranged across a forward edge of a header frame structure, a draper or auger transport arrangement for transporting the cut crop for further processing, and a reel with a reel drive mechanism for driving rotation of the reel including a variable speed drive motor and a drive transmission having two different drive ratios for high and low speed reel operation. The transmission is mounted in a housing with a readily removable cover part allowing access to a chain and sprocket drive system where the chain can be loosened to allow it to be transferred from one set of cooperating sprockets to another. The reel shaft is movable to release the chain tension and adjusted by a cam and ratchet arrangement.

18 Claims, 6 Drawing Sheets

(56) References Cited

U.S. PATENT DOCUMENTS

| | | | | |
|---|---|---|---|---|
| 6,708,475 B2* | 3/2004 | Guyer | ............ | A01D 57/03 |
| | | | | 56/220 |
| 7,392,124 B2* | 6/2008 | MacGregor | ............ | A01D 57/20 |
| | | | | 701/50 |
| 7,392,646 B2* | 7/2008 | Patterson | ............ | A01D 61/008 |
| | | | | 198/613 |
| 7,958,706 B2* | 6/2011 | Remillard | ............ | A01D 57/02 |
| | | | | 56/10.2 G |
| 8,387,351 B2* | 3/2013 | Guyer | ............ | A01D 57/00 |
| | | | | 56/226 |
| 9,392,745 B2* | 7/2016 | Bertino | ............ | A01D 34/06 |
| 9,526,209 B2* | 12/2016 | Honey | ............ | A01D 57/12 |
| 2003/0110749 A1* | 6/2003 | Frego | ............ | A01D 57/02 |
| | | | | 56/11.9 |
| 2016/0183465 A1* | 6/2016 | Honey | ............ | A01D 57/12 |
| | | | | 56/226 |

* cited by examiner

DRIVE SYSTEM FOR THE REEL OF A CROP HARVESTING HEADER

This invention relates to a drive system for the reel of a crop harvesting header.

BACKGROUND OF THE INVENTION

This invention relates to a crop harvesting header including a cutter bar and a reel for controlling movement of the crop in the area over the cutter bar. The reel is rotatable about an axis generally parallel to the cutter bar and has a plurality of reel bats each having reel tines projecting generally radially outwardly from the reel axis. The reef bats are pivotal each about a respective bat axis parallel to the reel axis so as to vary the angle of the tines about the bat axis as the reel rotates. Typically the reel co-operates with a cam carried on the header in generally stationary position so that each bat has a crank arm with a cam follower on the crank arm which follows the cam as the reel rotates and causes the required pivotal movement of the bat. An example of a header of this type is shown in U.S. Pat. No. 6,591,598 (Remillard) issued Jul. 15, 2003 to the present Assignees.

SUMMARY OF THE INVENTION

It is one object of the present invention to provide an improved crop harvesting header.

According to the invention there is provided a crop harvesting header comprising:

a header frame structure arranged for movement in a direction of working movement across ground carrying a crop to be harvested;

a cutter bar arranged across a forward edge of the header frame structure for cutting the crop;

a cut crop transport arrangement mounted on the header frame structure for receiving and transporting the cut crop for further processing;

and a reel for controlling movement of the crop in the area over the cutter bar;

the reel being mounted on the header frame structure for movement with the header in the direction of movement;

and a reel drive mechanism for driving rotation of the reel about a reel axis generally parallel to the cutter bar, the reel drive mechanism comprising:

a drive motor having a drive output, an output speed of which can be varied to provide a variable speed drive to the reel;

and a drive transmission for communicating the drive output to the reel, the drive transmission being arranged to provide at least two different drive ratios.

Preferably the drive transmission has an output shaft connected to a shaft of the reel typically at one end of the reel and typically adjacent the cam control system which controls the tine angles.

In a case where the reel has two independent sections arranged end to end the drive transmission can be located between the two sections and preferably has two output shafts each connected to a respective shaft of a respective one of the reel sections.

Preferably the transmission includes an elongate timing drive member driven by a sprocket on the drive output on the drive motor. Typically the drive member is a chain but also other similar devices can be used for example a typical timing belt.

Preferably the drive transmission includes a first and a second drive sprocket on the drive output on the drive motor and the chain is arranged to be movable from the first sprocket for the first drive ratio to the second sprocket for the second drive ratio.

Preferably the drive transmission includes a first and a second input drive sprocket on the drive output on the drive motor and a first and a second output drive sprocket for communicating drive to the reel, where the first sprockets are aligned and the second sprockets are aligned and the chain is arranged to be moved from a first position interconnecting the aligned the first sprockets for the first drive ratio to the aligned second sprockets for the second drive ratio. The sprockets are selected so that the same length of the chain locates the sprockets on the shaft forming the drive output on the motor and the output to the reel approximately at the same distance apart so that the chain can be simply transferred when the tension is released.

Preferably however there is provided a device for tensioning the chain across the sprockets which is operable to release the tension to allow the chain to be transferred and to take up tension differences from the change in length of the sprockets and from other effects such as wear or stretch.

Preferably the device for tensioning comprises a mounting member which allows relative movement between the drive output of the drive motor and the output shaft to the reel to change the distance therebetween. This is preferably done by mounting the output shaft to the reel on a movable support. However the drive motor can be mounted on a movable support. Preferably there is provided a housing for containing the sprockets and the chain and the movable support is movable within the housing. As an alternative to the movable mounting of one of the shafts carrying the sprockets, a separate tensioner can be provide which takes up the slack in the chain so that the shafts can remain fixed.

Preferably there is provided an adjustment device in the housing for setting the tension in the chain at a required value. This can be done by adjusting the relative positions of the shafts or by providing a separate tensioner.

Preferably the adjustment device comprises a ratchet and when the adjustment is carried out by supporting one of the shafts for movement, the ratchet controls the position of the support in the housing.

In order to allow simple manual access to the components to provide the change of the ratios, preferably the housing includes a removable cover portion which can be readily manually removed to expose the sprockets and the chain for manual movement thereof. In this case, preferably the housing cover portion is held in place by simple clips which can be manually removed without tools and when the housing cover portion is removed, the movable support is free to be moved without obstruction by the housing and without removing other parts.

The arrangement described herein thus allows the drive ratio to be changed in addition to the speed changes available from the variable speed motor. It has been found by careful analysis of the drive system of the reel in systems of this type that higher speeds of the reel are necessary to meet the high ground speed now available from other machine improvements. While it would normally be expected that such higher speeds could be met simply by increasing the speed available from the variable speed drive motor, it has been found that such higher speeds can lead to a reduced torque being available at lower speeds. In some cases the reduced torque becomes insufficient to prevent stalling of the reel movement in very heavy crop conditions. Thus it has been found necessary to provide a simple rapid way for the operator to change the drive ratios available to the system for both high speed and low speed operations.

The transmission components to provide the two, or more, separate ratios are located in the system that is within the housing so that the change can be made without tools and without separate spare parts.

BRIEF DESCRIPTION OF THE DRAWINGS

One embodiment of the invention will now be described in conjunction with the accompanying drawings in which.

DETAILED DESCRIPTION

Figure 1:
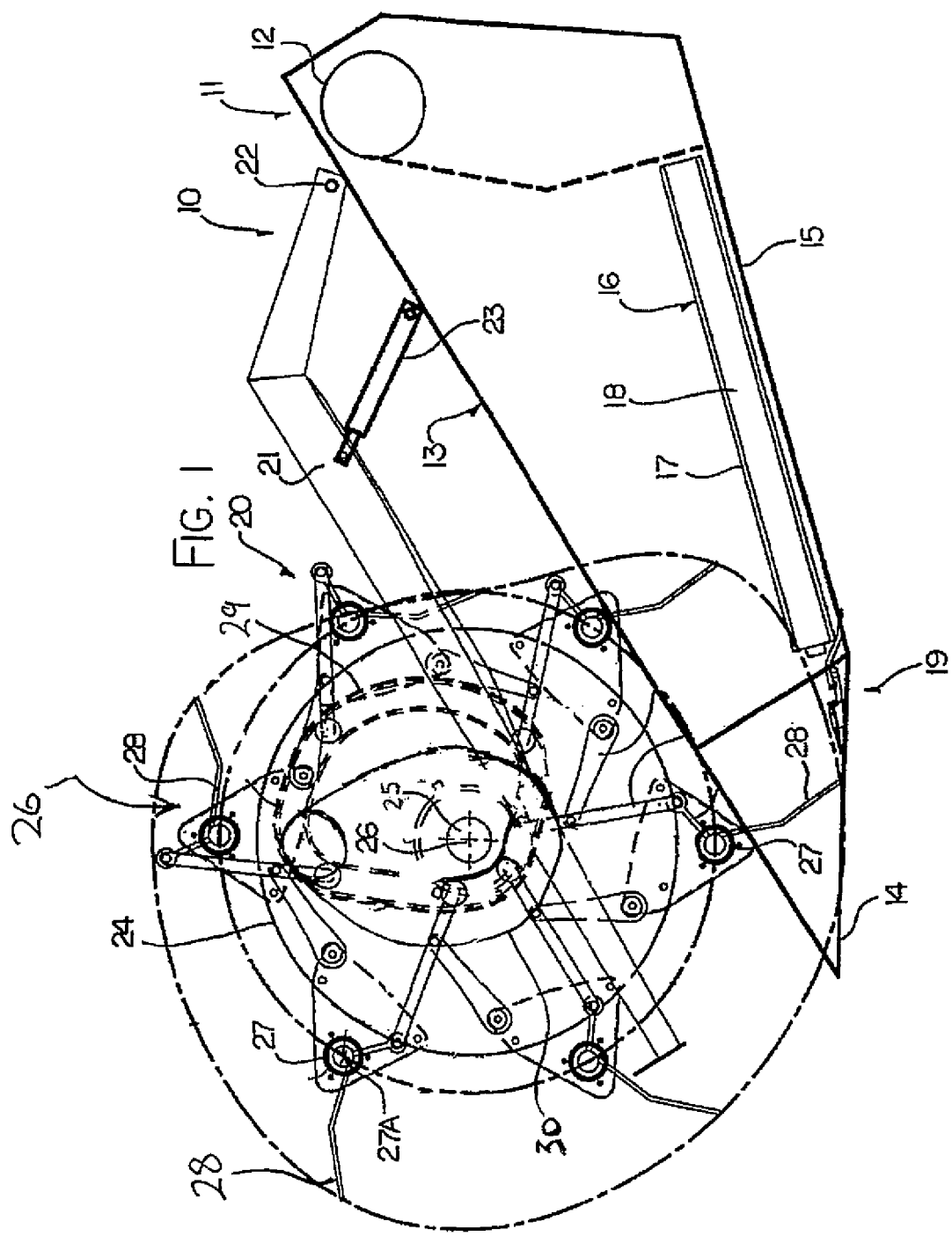
FIG. 1 is a side elevational view of a header according to the present invention.
Figure 2:
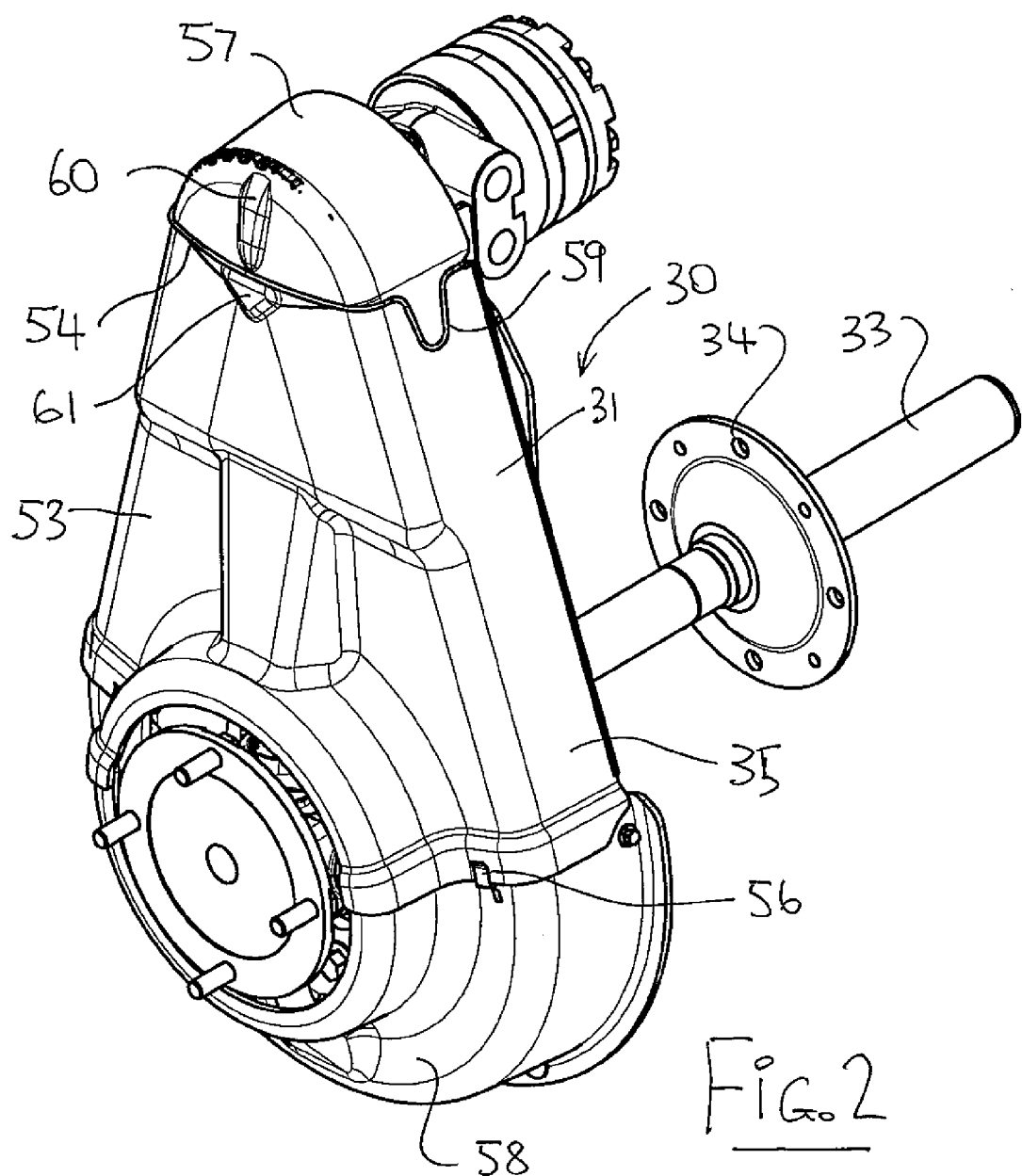
FIG. 2 is an isometric view of the drive system of the header of FIG. 1.
Figure 3:
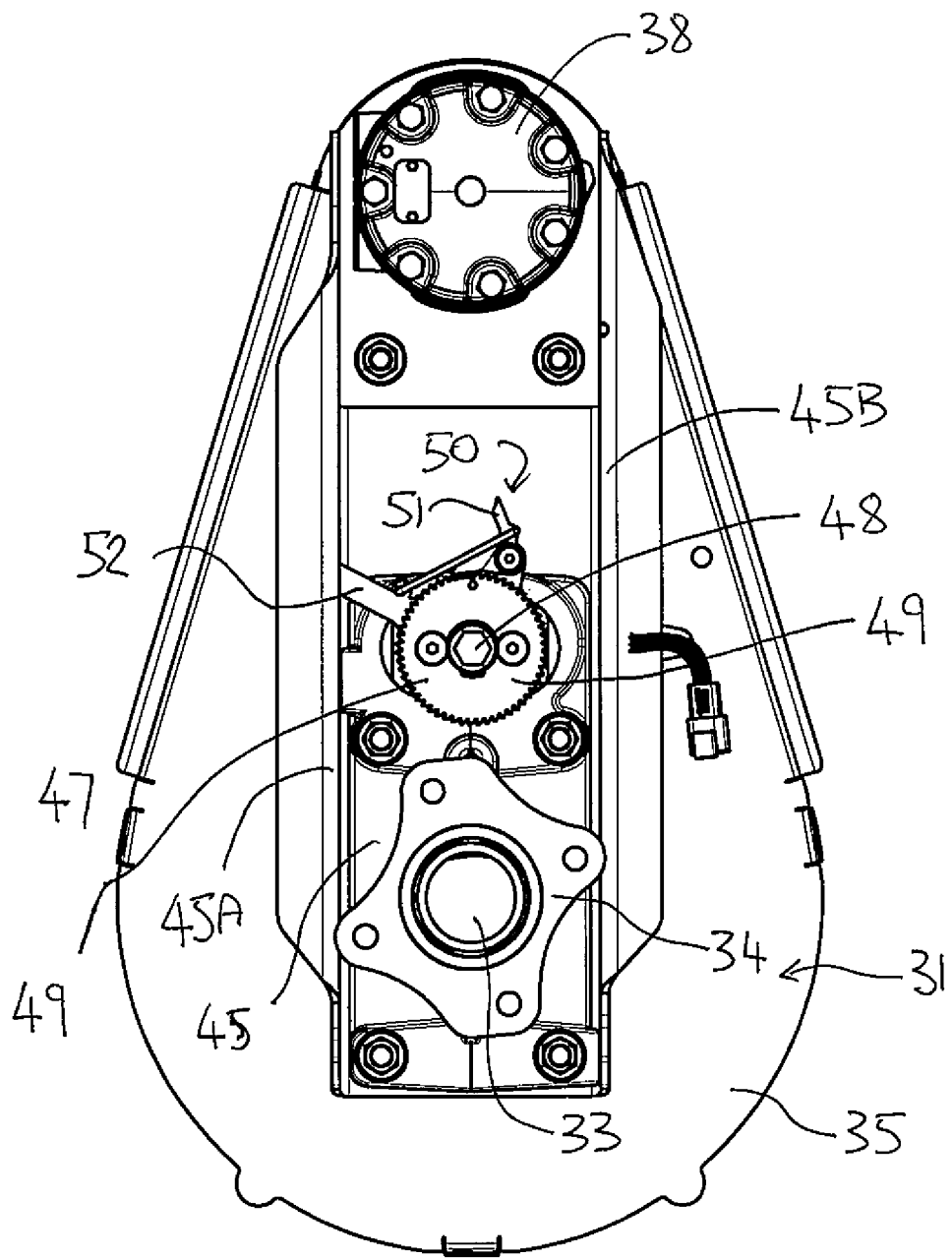
FIG. 3 is a rear elevational view of the drive system of FIG. 2 with the housing broken away to show the drive system.
Figure 4:
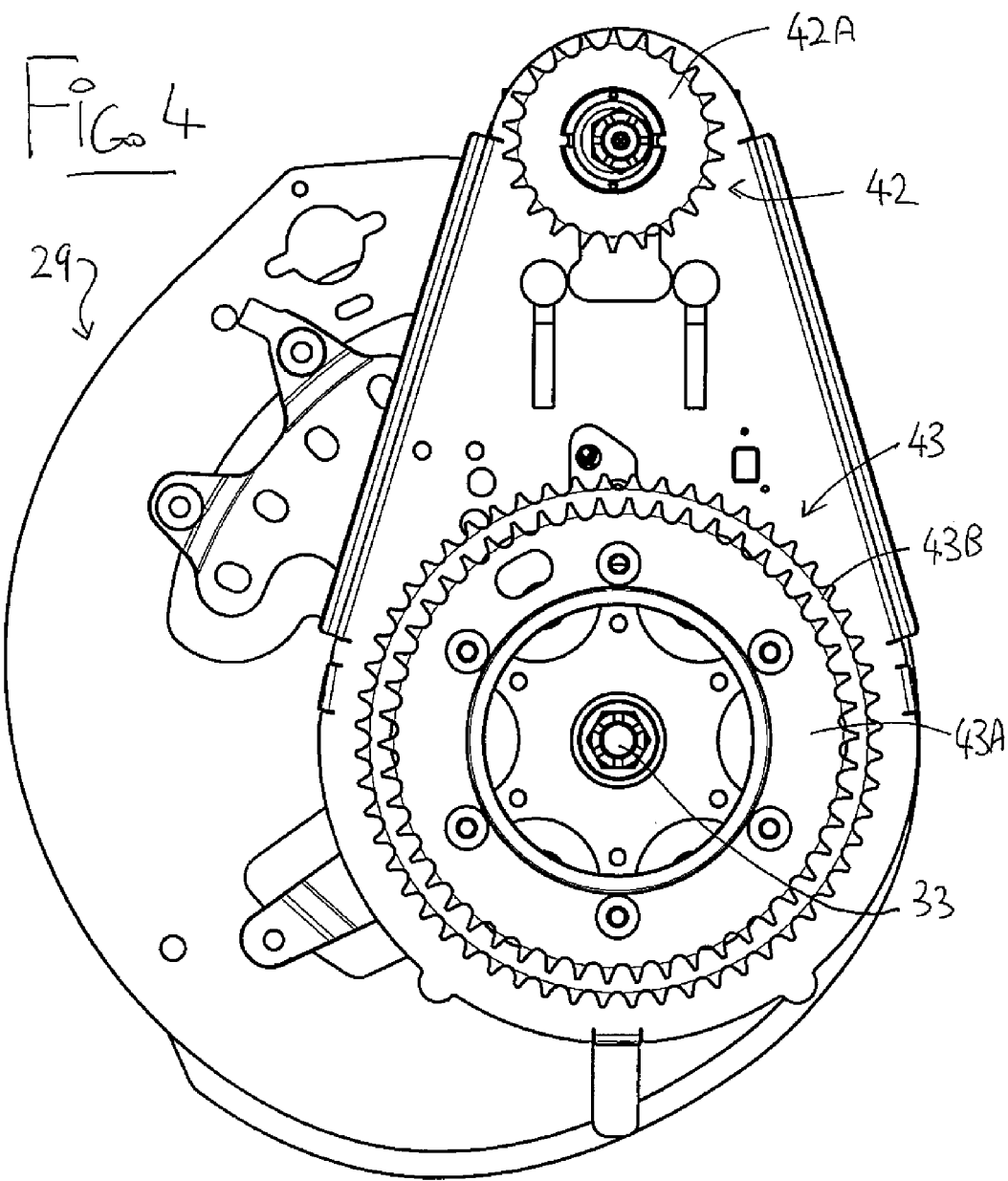
FIG. 4 is a front elevational view of the drive system of FIG. 2 with the housing broken away to show the drive system.
Figure 5:
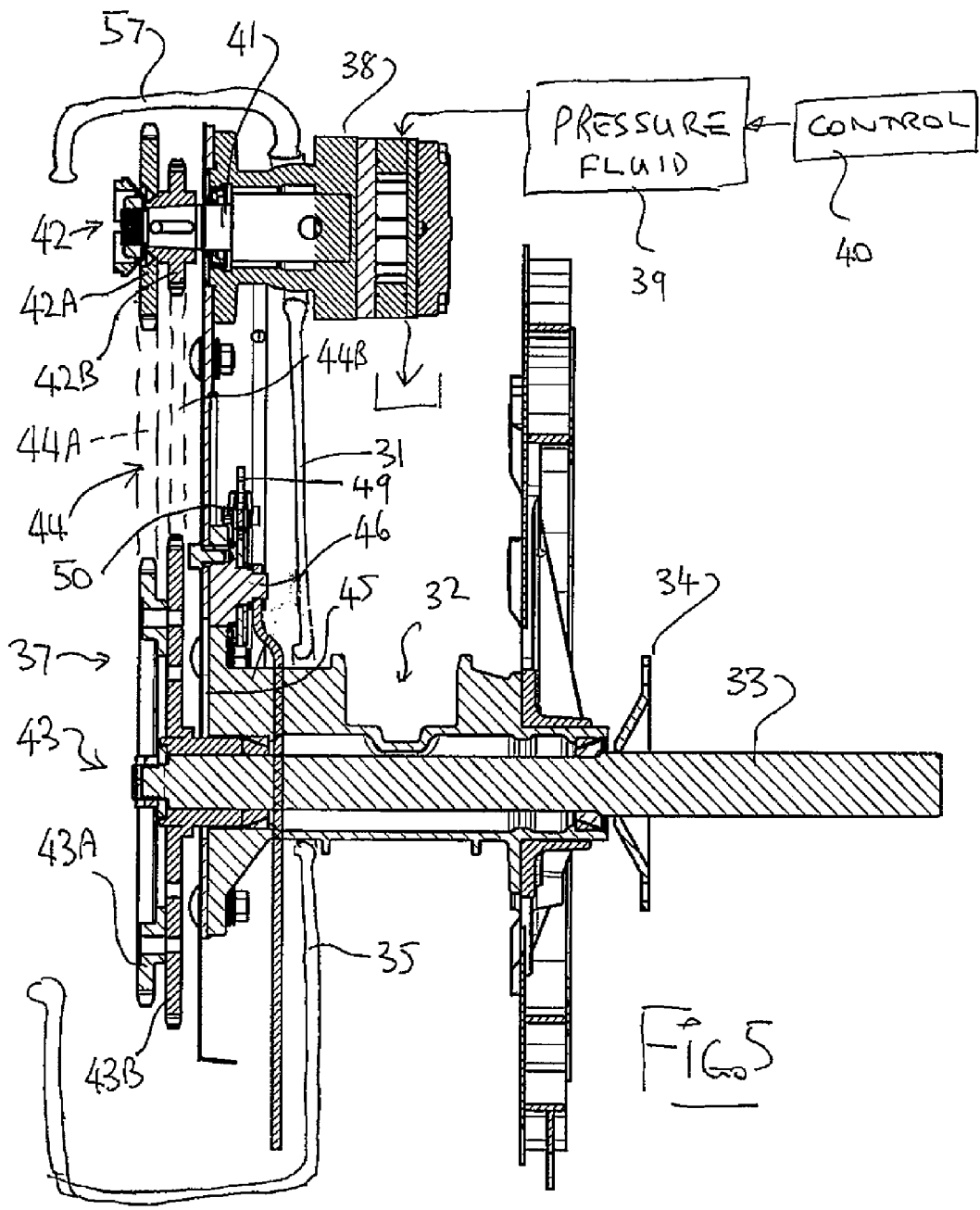
FIG. 5 is a vertical cross-sectional view of the drive system of FIG. 2 with the front cover removed.
Figure 6:
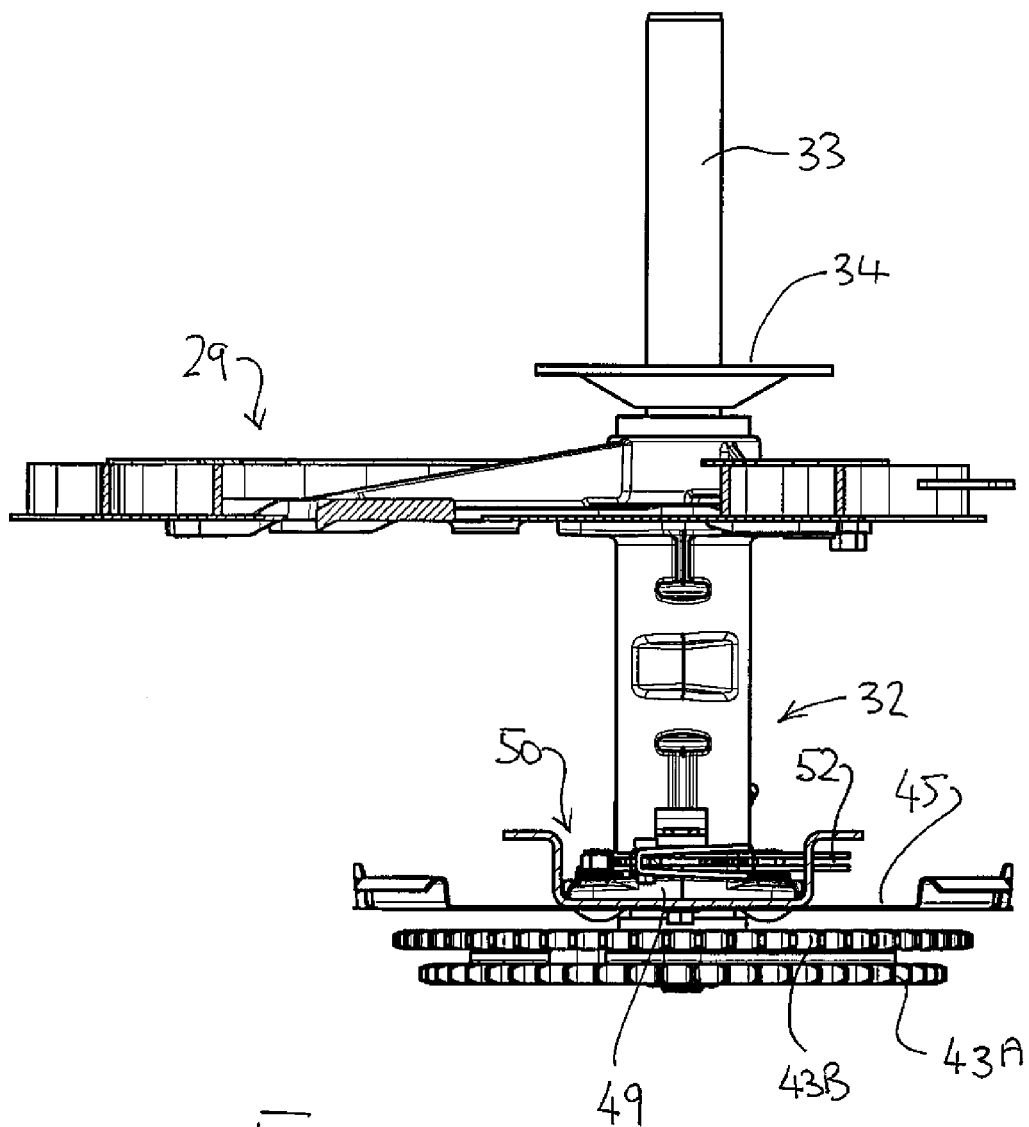
FIG. 6 is a top plan view of the drive system of FIG. 2 with the housing broken away to show the drive system.

In FIG. 1 is shown an embodiment of a header according to the present invention with a number of the elements being shown schematically since the general construction of such headers is well known to one skilled in the art. The header 10 includes a header frame 11 having a main frame tube 12 extending across the width of the header between two end frames one of which is shown at 13 and the other of which is of course at the other end and therefore not visible in the elevation of FIG. 1. The main tube 12 is suitably supported and attached on a propulsion vehicle in a manner so that the header frame can be moved forwardly across the ground in cutting a standing crop. The end frame 13 extends forwardly from the main tube 12 to a forward nose section 14. The main tube 12 carries a plurality of frame bars which extend downwardly and forwardly for supporting a table 15 of the header onto which crop material is deposited after cutting. The structural elements defining the frame bars on the table are not shown for convenience of illustration since again these are well known to one skilled in the art and can vary in accordance with engineering considerations.

On the table 15 is provided a crop conveyor 16 which is arranged to transport the crop after cutting across the width of a header to a discharge location. In the embodiment shown the conveyor is provided as a draper canvas 17 mounted on rollers 18. Other embodiments can use alternative crop transportation systems and primarily an auger which is commonly used as an alternative for the draper system. The embodiments of the present invention are not limited to either of the different types of header.

At the front of the table 15 is provided a cutter bar generally indicated at 19 which is again only shown schematically since the construction of this is well known to one skilled in the art. The cutter bar shown provides a sickle knife in guards which reciprocates back and forth in a cutting action on the standing crop so that the crop is deposited on the draper for transportation to the discharge location.

When used on a combine harvester the discharge location is associated with a crop transfer system which transfers the crop rearwardly into the feeder house of the combine. Headers of this type can of course also be used as a swather where the discharge location simply discharges the crop onto the ground in a swath or through a crop conditioner onto the ground.

The header further includes a reel generally indicated at 20. The reel 20 includes mounting arms 21 pivoted on a suitable mounting 22 adjacent the tube 12 so that the arms project forwardly from the frame to a position over the end frame elements 13 so as to provide support for the reel extending the header above the cutter bar. Each arm is movable in its pivotal action by a suitable drive actuator 23.

The number of arms can vary in accordance with engineering requirements depending upon the width of the header. Some headers have only arms at the ends and some have additional arms intermediate the ends to provide the necessary support.

The reel 20 thus is mounted by the arms on the header frame structure for movement with the header in the direction of movement. The reel includes a shaft 25 mounted for rotation about an axis 26 on the arms and driven by a rotary drive mechanism 30 for driving rotation of the reel about the reel axis which is generally parallel to the cutter bar.

The reel has a plurality of reel bats 26 at spaced positions around the reel axis 26 with each reel bat 26 having a tine tube 27 and a plurality of tines 28 mounted on the tine tube 27 and projecting generally radially outwardly from an axis 27A of the tine tube 27 parallel to the reel axis 26.

Each of the reel bats 26 is pivotal about its respective axis 27A so as to vary the angle of the tines or fingers about the bat axis as the reel rotates. A cam arrangement 29 described in detail in the above patent of Remillard drives this movement at angular positions around the reel axis with the bats pivoting rapidly back and forth as the reel rotates.

The reel drive mechanism for driving rotation of the reel about a reel axis generally parallel to the cutter bar is generally indicated at 30 and is mounted, in a single part reel, on one end of the reel.

The reel drive mechanism 30 comprises a housing 31 which is mounted on one of the reel support arms 21 at a coupling 32 so that the housing is fixed with the reel support arms on the reel axis and provides an output drive shaft 33 for connection to the reel shaft 25 at a disk coupling 34 which bolts onto a cooperating coupling on the shaft 25 (not shown).

The housing 31 comprises a back plate 35 and a front container portion 36 enclosing an interior area receiving a drive transmission 37.

The reel drive mechanism includes a hydraulic drive motor 38 powered by fluid from the drive vehicle which includes a fluid supply 39 and a control 40 which operates to control a rate of supply of the fluid so as to vary a rotation rate of the motor in conventional manner.

The motor 38 has a drive output shaft 41, an output speed of which can be varied by the control 40 to provide a variable speed drive to the reel. The output shaft provides rotary drive to the drive transmission 37 for communicating the drive output to the reel through the output shaft 33.

The shaft 41 communicates drive to the shaft 33 though a sprocket assembly 42 on the shaft 41 and a sprocket assembly 43 on the shaft 43 connected by a chain 44. Each of the sprocket assemblies 42 and 43 comprises a pair of sprockets 42A and 42B which cooperate with sprockets 43A and 43B respectively so that the drive transmission is arranged to provide two different drive ratios. It will be appreciated that more than two drive ratios can be provided by addition of further sprockets at the assemblies 42 and 43. However typically two drive ratios is sufficient.

Thus the drive transmission includes a first and a second input drive sprocket 42A and 42B on the drive output 41 on the drive motor 38 and a first and a second output drive sprocket 43A and 43B for communicating drive to the reel through the shaft 33. The first sprockets 42A and 43A are aligned and the second sprockets 42B and 43B are aligned and the chain is arranged to be movable from a first position interconnecting the aligned the first sprockets 42A, 43A for the first drive ratio to the aligned second sprockets 42B, 43B for the second drive ratio.

The shaft 33, its bearings 33A and the sprockets 43 are carried on a plate 45 which is mounted in the housing 31 for sliding movement in a direction toward and away from the shaft 41 so as to increase and decrease the spacing between the sprocket assemblies 42 and 43. This movement therefore acts as a device for tensioning the chain 44 across the sprockets. The plate is guided in slides 45A and 45B and is moved by an eccentric cam 46 carried on the housing an operable in a slot 47 in the plate 45. Operation of the cam 46 by a wrench applied onto a nut 48 rotates the cam and is operable to release the tension on the chain 44 to allow the chain to be transferred from the sprockets 42A, 43A as shown at first position 44A to the sprockets 42B, 43B as shown at second position 44B. This transfer is done manually after the tension is released and sufficient slack made available to lift the chain off the sprockets.

Thus the plate 45 acts a mounting member which allows relative movement between the drive output 41 of the drive motor 38 and the output shaft 33 to the reel to change the distance therebetween.

The cam 46 carries a ratchet 49 which rotates with the cam relative to a pawl 50 which can be released by a finger lever 51. In order to allow the movement to release the tension therefore the pawl is lifted and the cam rotated to drive movement of the plate 45.

After the transfer of the chain is completed, the cam 46 is rotated in the opposite direction to drive the plate 45 in a direction to tighten the chain to a required tension. This rotation of the cam rotates the ratchet over the pawl until sufficient tension is obtained whereupon the pawl holds the ratchet at the required angular position to maintain this tension. A bar 52 projecting through a hole in the guide 45A locates the ratchet is held against unintended movement. The simple actuation of the movement of the plate which supports the shaft 33 which can be achieved in a controlled manner by the ratchet thus allows the user to quickly change the transmission from the first ratio to the second ratio.

In order to rapidly access the interior of the housing to the housing includes a removable cover portion 53 which defines a front upper part of the housing 31 with a top edge 54 and a bottom edge 55 which can be readily manually removed to expose the sprockets 42, 43 and the elongate timing drive member 44 for manual movement thereof as described above. The housing includes an upper cap portion 57 over the upper sprocket 42 and a bottom generally semi-cylindrical portion 58 surrounding the bottom sprockets 43. The upper edge of the bottom portion 58 has clips 56 which receive and hold the bottom edge 55 of the portion 53 to hold it in place when assembled. The top edge 54 is retained by a spring clip 59 which is carried on the housing 31 held in place between two projecting portions 60 and 61 and which can be lifted off the portion 53 over the projection 60 to allow it to be pivoted forwardly for opening and lifting from the clips 56. This simple release of the front cover portion 53 without the use of tools allows the movable support to be exposed and free to be moved.

The following instructions for the actions to be taken are provided:
  unlatch top cover and remove drive cover 53
  loosen chain 44 using the wrench on the ratchet 49 and cam drive 46
  hold the ratchet release 50 in unlocked position
  rotate wrench handle on cam drive nut 48 upwards to loosen the chain 44 and move the chain 44 to appropriate sprocket set 42A, 42B
  chain 44 on small driven sprocket 42B provides high speed. This can provide in one example a maximum torque in the range 13,000 to 14,000 in-lbs and a maximum speed of the order of 115 rpm.
  chain 44 on large driven sprocket 42A provides high torque. This can provide in one example a maximum torque in the range 23,000 to 24,000 in-lbs and a maximum speed of the order of 73 rpm.
  tighten the chain 44 by moving the plate 45
  rotate wrench handle on nut 48 downwards until tight
  re-install cover 53 and secure with latch 59.

The invention claimed is:

1. A crop harvesting header comprising:
  a header frame structure;
  a cutter bar arranged across a forward edge of the header frame structure;
  a cut crop transport arrangement mounted on the header frame structure for receiving and transporting the cut crop;
  and a reel mounted on the header frame structure;
  and a reel drive mechanism driving rotation of a reel input drive shaft of the reel about a reel axis generally parallel to the cutter bar, the reel drive mechanism comprising:
    a variable speed drive motor having a drive output shaft and a controller which varies an output speed of the drive motor;
    and a drive transmission connected between the drive output shaft of the drive motor and the reel input drive shaft;
    the drive transmission including first components which are selected to provide a first drive ratio between the drive output shaft and the reel input drive shaft and second components which are selected to provide a second drive ratio, different from the first drive ratio, between the drive output shaft and the reel input drive shaft.

2. The header according to claim 1 wherein the first components comprise a first drive sprocket on the drive output shaft of the drive motor and a first output drive sprocket on the reel input drive shaft for communicating drive to the reel, wherein the first sprockets are aligned and wherein the second components comprise a second input drive sprocket on the drive output shaft and a second output drive sprocket on the reel input drive shaft for communicating drive to the reel wherein the second sprockets are aligned and wherein an elongate timing drive member is transferred from a first position interconnecting the aligned first sprockets for the first drive ratio to a second position interconnecting the aligned second sprockets for the second drive ratio.

3. The header according to claim 2 wherein there is provided a device for tensioning the elongate timing drive member across the first sprockets and across the second sprockets which is operable to release tension in the elongate timing drive member to allow the elongate timing drive member to be transferred.

4. The header according to claim 3 wherein the device for tensioning comprises a mounting member which allow relative movement between the drive output shaft of the drive motor and the reel input drive shaft to the reel to change a distance therebetween.

5. The header according to claim 4 wherein the reel input drive shaft to the reel is mounted on a movable support.

6. The header according to claim 5 wherein there is provided a housing for containing the first sprockets, the second sprockets and the elongate timing drive member and wherein the movable support is movable within the housing.

7. The header according to claim 6 wherein there is provided an adjustment device in the housing for setting the tension in the elongate timing drive member at a required value.

8. The header according to claim 7 wherein the adjustment device comprises a ratchet.

9. The header according to claim 6 wherein the housing includes a removable cover portion which can be readily manually removed to expose the first sprockets, the second sprockets and the elongate timing drive member for manual movement of the elongate timing drive member.

10. The header according to claim 9 wherein the removable cover portion is held in place by clips.

11. The header according to claim 9 wherein when the removable cover portion is removed, the movable support is free to be moved.

12. The header according to claim 2 wherein there is provided a housing for containing the first sprockets, the second sprockets and the elongate timing drive member and wherein the housing includes a removable cover portion which can be readily manually removed to expose the first sprockets, the second sprockets and the elongate timing drive member for manual movement of the elongate timing drive member.

13. The header according to claim 12 wherein the removable cover portion is held in place by clips.

14. A crop harvesting header comprising:
a header frame structure;
a cutter bar arranged across a forward edge of the header frame structure;
a cut crop transport arrangement mounted on the header frame structure for receiving and transporting the cut crop;
and a reel mounted on the header frame structure;
and a reel drive mechanism driving rotation of the reel about a reel axis generally parallel to the cutter bar, the reel drive mechanism comprising:
a variable speed drive motor and a controller which varies an output speed of the drive motor;
and a drive transmission connected between the drive motor and the reel;
wherein the drive transmission includes a first input drive sprocket and a first output drive sprocket aligned with the first input drive sprocket and communicating drive to the reel,
wherein the drive transmission includes a second input drive sprocket and a second output drive sprocket aligned with the second input drive sprocket and communicating drive to the reel,
and wherein the drive transmission comprises an elongate timing drive member which is transferred from a first position interconnecting the aligned first sprockets to provide a first drive ratio between the drive motor and the reel and a second position interconnecting the aligned second sprockets to provide a second drive ratio, different from the first drive ratio, between the motor and the reel.

15. The header according to claim 14 wherein there is provided a device for tensioning the elongate timing drive member across the first sprockets and across the second sprockets which is operable to release tension in the elongate timing drive member to allow the elongate timing drive member to be transferred.

16. The header according to claim 15 wherein there is provided a housing for containing the first sprockets, the second sprockets and the elongate timing drive member and wherein the device for tensioning is movable within the housing.

17. The header according to claim 16 wherein the housing includes a removable cover portion which can be readily manually removed to expose the first sprockets, the second sprockets and the elongate timing drive member.

18. The header according to claim 17 wherein the removable cover portion is held in place by clips.

* * * * *